United States Patent
Yanggratoke et al.

(10) Patent No.: US 12,489,686 B2
(45) Date of Patent: Dec. 2, 2025

(54) RADIO ACCESS NETWORK SLICE FEASIBILITY CHECK BASED ON MACHINE LEARNING

(71) Applicant: Telefonaktiebolaget LM Ericsson (publ), Stockholm (SE)

(72) Inventors: Rerngvit Yanggratoke, Järfälla (SE); Serveh Shalmashi, Enebyberg (SE); Paul Stjernholm, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/284,907

(22) PCT Filed: Mar. 31, 2021

(86) PCT No.: PCT/EP2021/058490
§ 371 (c)(1),
(2) Date: Sep. 29, 2023

(87) PCT Pub. No.: WO2022/207102
PCT Pub. Date: Oct. 6, 2022

(65) Prior Publication Data
US 2024/0380673 A1    Nov. 14, 2024

(51) Int. Cl.
*H04W 28/18*    (2009.01)
*H04L 41/147*    (2022.01)
(Continued)

(52) U.S. Cl.
CPC .......... *H04L 41/147* (2013.01); *H04W 24/02* (2013.01); *H04W 28/24* (2013.01)

(58) Field of Classification Search
CPC ..... H04W 24/02; H04W 24/10; H04W 28/24; H04W 24/04; H04W 28/0247; H04L 41/0803
See application file for complete search history.

(56) References Cited

U.S. PATENT DOCUMENTS

2018/0077024 A1* 3/2018 Zhang ................. H04L 41/0803
2018/0324663 A1* 11/2018 Park ....................... H04W 36/22
(Continued)

OTHER PUBLICATIONS

International Search Report and Written Opinion of the International Searching Authority, PCT/EP2021/058490, mailed Dec. 9, 2021, 13 pages.
(Continued)

*Primary Examiner* — Nicholas R Taylor
*Assistant Examiner* — Ho T Shiu
(74) *Attorney, Agent, or Firm* — Sage Patent Group

(57) ABSTRACT

A method for a feasibility check of a new RAN slice performed by a network node is provided. The method includes computing a first estimate of occupied resources for each resource within at least one of the network node and a cell of the network node. The first estimate performed for each resource using historical data of a measurement of utilization of each resource. The method further includes applying a trained supervised machine learning model to provide a second estimate of resource demand for each resource for the new RAN slice. The method further includes comparing a sum of the first estimate and the second estimate to a defined threshold value; and admitting the new RAN slice when the sum has a value not greater than the defined threshold value per resource.

20 Claims, 9 Drawing Sheets

(51) Int. Cl.
   *H04W 24/02*   (2009.01)
   *H04W 28/26*   (2009.01)
   *H04W 72/04*   (2023.01)
   *H04W 28/24*   (2009.01)

(56) References Cited

U.S. PATENT DOCUMENTS

2020/0178093 A1* 6/2020 Peng ............... H04W 36/00838
2021/0022024 A1  1/2021 Yao et al.
2022/0124547 A1* 4/2022 Young ............... H04W 28/0247

OTHER PUBLICATIONS

ETSI GS ENI 001 V3.1.1 (Dec. 2020); European Telecommunications Standards Institute; Group Specification; Experiential Networked Intelligence (ENI); ENI use cases; 118 pages.

3GPP TR 28.809 V2.0.0 (Mar. 2021); 3rd Generation Partnership Project; Technical Specification Group Services and System Aspects; Management and orchestration; Study on enhancement on Management Data Analytics (MDA), Release 17, 98 pages.

Bega, Dario et al., "DeepCog: Cognitive Network Management in Sliced 5G Networks with Deep Learning," IEEE Infocom 2019—IEEE Conference on Computer Communications, Apr. 29, 2019, 9 pages.

Intel, "pCR Update based on comments provided by Edithelp," 3GPP TSG-SA5 Meeting #134e, S5-206093, Nov. 16-25, 2020, E-meeting, 60 pages.

Ericsson, "AI/ML based Use Cases," 3GPP TSG-RAN WG3 Meeting #110-e, R3-206437, Online meeting, Nov. 2-12, 2020, 16 pages.

Adamuz-Hinojosa et al., "Sharing gNB components in RAN slicing: A perspective from 3GPP/NFV standards," IEEE Conference in Standards for Communications and Networking (CSCN), 2019, arXiv:2001.01980v1, Jan. 7, 2020, 7 pages.

Ojijo, Mourice O. et al., "A Survey on Slice Admission Control Strategies and Optimization Schemes in 5G Network," Digital Object Identifier 10.1109/ACCESS.2020.2967626, 14 pages.

Han, Bin et al., "A Markov Model of Slice Admission Control," arXiv:1804.01861v5, Aug. 30, 2018, 4 pages.

Vilà, I et al., "Performance Measurements-based Estimation of Radio Resource Requirements for Slice Admission Control," IEEE, 2019, 6 pages.

3GPP TS 32.421 V17.0.0 (Sep. 2020); 3rd Generation Partnership Project; Technical Specification Group Services and System Aspects; Telecommunication management; Subscriber and equipment trace; Trace concepts and requirements (Release 17), 49 pages.

3GPP TS 28.530 V16.4.0 (Dec. 2020); 3rd Generation Partnership Project; Technical Specification Group Services and System Aspects; Management and orchestration; Concepts, use cases and requirements (Release 16), 31 pages.

3GPP TS 32.421 V16.1.0 (Mar. 2020); 3rd Generation Partnership Project; Technical Specification Group Services and System Aspects; Telecommunication management; Subscriber and equipment trace; Trace concepts and requirements (Release 16), 49 pages.

* cited by examiner

Compute a first estimate of occupied resources for each resource within at least one of the network node and a cell of the network node, the first estimate performed for each resource in each interval of time in a plurality of intervals of time using historical data of a measurement of utilization of each resource  701

Apply a trained supervised machine learning model to provide a second estimate of resource demand for each resource in each interval of time in the plurality of intervals of time for the new RAN slice  703

Compare a sum of the first estimate and the second estimate for each interval of time and each resource to a defined threshold value  705

Admit the new RAN slice when the sum for each interval of time has a value not greater than the defined threshold value per resource  707

Figure 7

```
┌─────────────────────────────────────────────────────────────────────────────┐
│ Collect historical data for each of a plurality of network nodes and each of a corresponding cell │
│ for each of a plurality of network nodes in a live telecommunications network        801          │
└─────────────────────────────────────────────────────────────────────────────┘
                                        ▼
┌─────────────────────────────────────────────────────────────────────────────┐
│ Extract (i) historical data from at least one of the network node and at least one cell of the    │
│ network node, and (ii) data from the new RAN slice, the data including a RAN slice profile        │
│                                                                                      803          │
└─────────────────────────────────────────────────────────────────────────────┘
                                        ▼
┌─────────────────────────────────────────────────────────────────────────────┐
│ Identify the historical data providing a value for each resource and each time interval    805    │
└─────────────────────────────────────────────────────────────────────────────┘
                                        ▼
┌─────────────────────────────────────────────────────────────────────────────┐
│ Merge, into merged data, the identified historical data with a plurality of the RAN slice profiles, │
│ each historical data being associated with a historical RAN slice and a corresponding RAN slice   │
│ profile                                                                              807          │
└─────────────────────────────────────────────────────────────────────────────┘
                                        ▼
┌─────────────────────────────────────────────────────────────────────────────┐
│ Divide merged data into two portions of divided data comprising a first portion of data from the  │
│ merged data prior to deployment of the historical RAN slice, and a second portion of data from    │
│ the merged data subsequent to deployment of the historical RAN slice                 809          │
└─────────────────────────────────────────────────────────────────────────────┘
                                        ▼
┌─────────────────────────────────────────────────────────────────────────────┐
│ Store the divided data in a centralized location                                     811          │
└─────────────────────────────────────────────────────────────────────────────┘
                                        ▼
┌─────────────────────────────────────────────────────────────────────────────┐
│ Compute a first estimate of occupied resources for each resource within at least one of a         │
│ function of a network node and a cell of the network node, the first estimate performed for       │
│ each resource in each interval of time in a plurality of intervals of time using historical data of a │
│ measurement of utilization of each resource                                          701          │
└─────────────────────────────────────────────────────────────────────────────┘
                                        ▼
┌─────────────────────────────────────────────────────────────────────────────┐
│ Apply a trained machine learning model to provide a second estimate of resource demand for        │
│ each resource in each interval of time in the plurality of intervals of time for the new RAN slice │
│                                                                                      703          │
└─────────────────────────────────────────────────────────────────────────────┘
                                        ▼
┌─────────────────────────────────────────────────────────────────────────────┐
│ Compare a sum of the first estimate and the second estimate for each interval of time to a        │
│ defined threshold value                                                              705          │
└─────────────────────────────────────────────────────────────────────────────┘
              ▼                                                    ▼
┌──────────────────────────────────────┐    ┌──────────────────────────────────────┐
│ Admit the new RAN slice when the sum for │    │ Reject the new RAN slice when the sum for │
│ each interval of time has a value not greater │    │ an interval of time in the plurality of   │
│ than the defined threshold value     │    │ intervals of time has a value greater than │
│                                707   │    │ the defined threshold value          813  │
└──────────────────────────────────────┘    └──────────────────────────────────────┘
```

Figure 8

Train supervised machine learning model to estimate resource demand for a new RAN slice for the telecommunications network across a plurality of network nodes and cells within the plurality of network nodes
901

Figure 9

RADIO ACCESS NETWORK SLICE FEASIBILITY CHECK BASED ON MACHINE LEARNING

CROSS REFERENCE TO RELATED APPLICATIONS

This application is a 35 U.S.C. § 371 national stage application of PCT International Application No. PCT/EP2021/058490 filed on Mar. 31, 2021, the disclosure and content of which is incorporated by reference herein in its entirety.

TECHNICAL FIELD

The present disclosure relates generally to feasibility check of a new radio access network (RAN) slice performed by a network node in a telecommunications network, and related methods and apparatuses.

BACKGROUND

Network slicing is a feature of, e.g., fifth generation (5G) systems that allows the partitioning of a single network into a number of segregated logical networks, each optimized for a particular type of service, or dedicated to a particular customer and/or application. A network slice may be referred to as a logical network serving a defined business purpose and/or customer, including all required network resources configured together. The term "network slice" has been formally introduced by 3GPP in the context of NR standalone (SA) deployments with a 5G core (5GC) network. The 3GPP standard defines an end to end (E2E) slicing approach with network-wide applicability where radio access network (RAN) slicing is part of network slicing. Essentially, network slicing provides a way to reserve (or partition) the network resources for one or more slices and to keep those resources isolated from each other.

Each network slice uses a set of network resources. The resources can be physical or virtual network functions and be dedicated per slice or shared among different slices. The resources assigned to a network slice can be selected and configured to fulfill the requirements of a specific business case or service.

The International Telecommunication Union (ITU) has defined three broad categories of network slices, namely ultra-reliable low latency communication (uRLLC), massive machine type communication (mMTC) and enhanced mobile broadband (eMBB) slices.

SUMMARY

In various embodiments, a method for a feasibility check of a new radio access network, RAN, slice performed by a network node in a telecommunications network is provided. The method includes computing a first estimate of occupied resources for each resource within at least one of the network node and a cell of the network node. The first estimate performed for each resource in each interval of time in a plurality of intervals of time using historical data of a measurement of utilization of each resource. The method further includes applying a trained supervised machine learning model to provide a second estimate of resource demand for each resource in each interval of time in the plurality of intervals of time for the new RAN slice. The method further includes comparing a sum of the first estimate and the second estimate for each interval of time and each resource to a defined threshold value. The method further includes admitting the new RAN slice when the sum for each interval of time has a value not greater than the defined threshold value per resource.

In various embodiments, a network node for a telecommunications network is provided. The network node includes processing circuitry, and at least one memory coupled with the processing circuitry. The memory includes instructions that when executed by the processing circuitry causes the network node to perform operations for a new radio access network, RAN, slice feasibility check. The operations include compute a first estimate of occupied resources for each resource within at least one of a function of the network node and a cell of the network node. The first estimate performed for each resource in each interval of time in a plurality of intervals of time using historical data of a measurement of utilization of each resource. The operations further include apply a trained machine learning model to provide a second estimate of resource demand for each resource in each interval of time in the plurality of intervals of time for the new RAN slice. The operations further include compare a sum of the first estimate and the second estimate for each interval of time to a defined threshold value. The operations further include admit the new RAN slice when the sum for each interval of time has a value not greater than the defined threshold value.

In various embodiments, a network node for a telecommunications network is provided. The network node is adapted to perform operations for a feasibility check of a new radio access network, RAN, slice. The operations include compute a first estimate of occupied resources for each resource within at least one of the network node and a cell of the network node. The first estimate performed for each resource in each interval of time in a plurality of intervals of time using historical data of a measurement of utilization of each resource. The operations further include apply a trained supervised machine learning model to provide a second estimate of resource demand for each resource in each interval of time in the plurality of intervals of time for the new RAN slice. The operations further include compare a sum of the first estimate and the second estimate for each interval of time and each resource to a defined threshold value. The operations further include admit the new RAN slice when the sum for each interval of time has a value not greater than the defined threshold value per resource.

In various embodiments, a computer program including program code to be executed by processing circuitry of a network node for a telecommunications network is provided. The program code causes the network node to perform operations for a feasibility check of a new radio access network, RAN, slice including compute a first estimate of occupied resources for each resource within at least one of the network node and a cell of the network node. The first estimate performed for each resource in each interval of time in a plurality of intervals of time using historical data of a measurement of utilization of each resource. The operations further include apply a trained supervised machine learning model to provide a second estimate of resource demand for each resource in each interval of time in the plurality of intervals of time for the new RAN slice. The operations further include compare a sum of the first estimate and the second estimate for each interval of time and each resource to a defined threshold value. The operations further include admit the new RAN slice when the sum for each interval of time has a value not greater than the defined threshold value per resource.

In various embodiments, a computer program product including a non-transitory storage medium including program code to be executed by processing circuitry of a network node for a telecommunications network is provided. Execution of the program code causes the network node to perform operations for a feasibility check of a new radio access network, RAN, slice. The operations include compute a first estimate of occupied resources for each resource within at least one of the network node and a cell of the network node. The first estimate performed for each resource in each interval of time in a plurality of intervals of time using historical data of a measurement of utilization of each resource. The operations further include apply a trained supervised machine learning model to provide a second estimate of resource demand for each resource in each interval of time in the plurality of intervals of time for the new RAN slice. The operations further include compare a sum of the first estimate and the second estimate for each interval of time and each resource to a defined threshold value. The operations further include admit the new RAN slice when the sum for each interval of time has a value not greater than the defined threshold value per resource.

A feasibility check of a new RAN slice may be manual and, thus, time consuming and less accurate compared to, e.g., taking measurements. Furthermore, an expected outcome may depend on individual experience of a radio expert performing the cell planning. Additionally, limitations may exist on assumptions that a feasibility check of a new RAN slice is built on. Potential advantages provided by various embodiments of the present disclosure may include a feasibility check of a new RAN slice having increased accuracy and flexibility as compared to an expert knowledge domain. For example, decisions may be more accurate and may not be dependent on human experience, but rather take into account time aspects, traffic, available radio resources, and processing powers, etc. Further potential advantages may include providing an automated method that considers the dynamic nature of a network, including e.g., for a long term, in performing a new RAN slice feasibility check; and efficient use of radio resources and processing resources available. Such an automated method may save time and engineering efforts, which may lead to a reduction in operating costs, in comparison to a manual process.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIGS. 7-9 are flow charts illustrating operations of a network node in accordance with some embodiments of the present disclosure.

DETAILED DESCRIPTION

Figure 1:
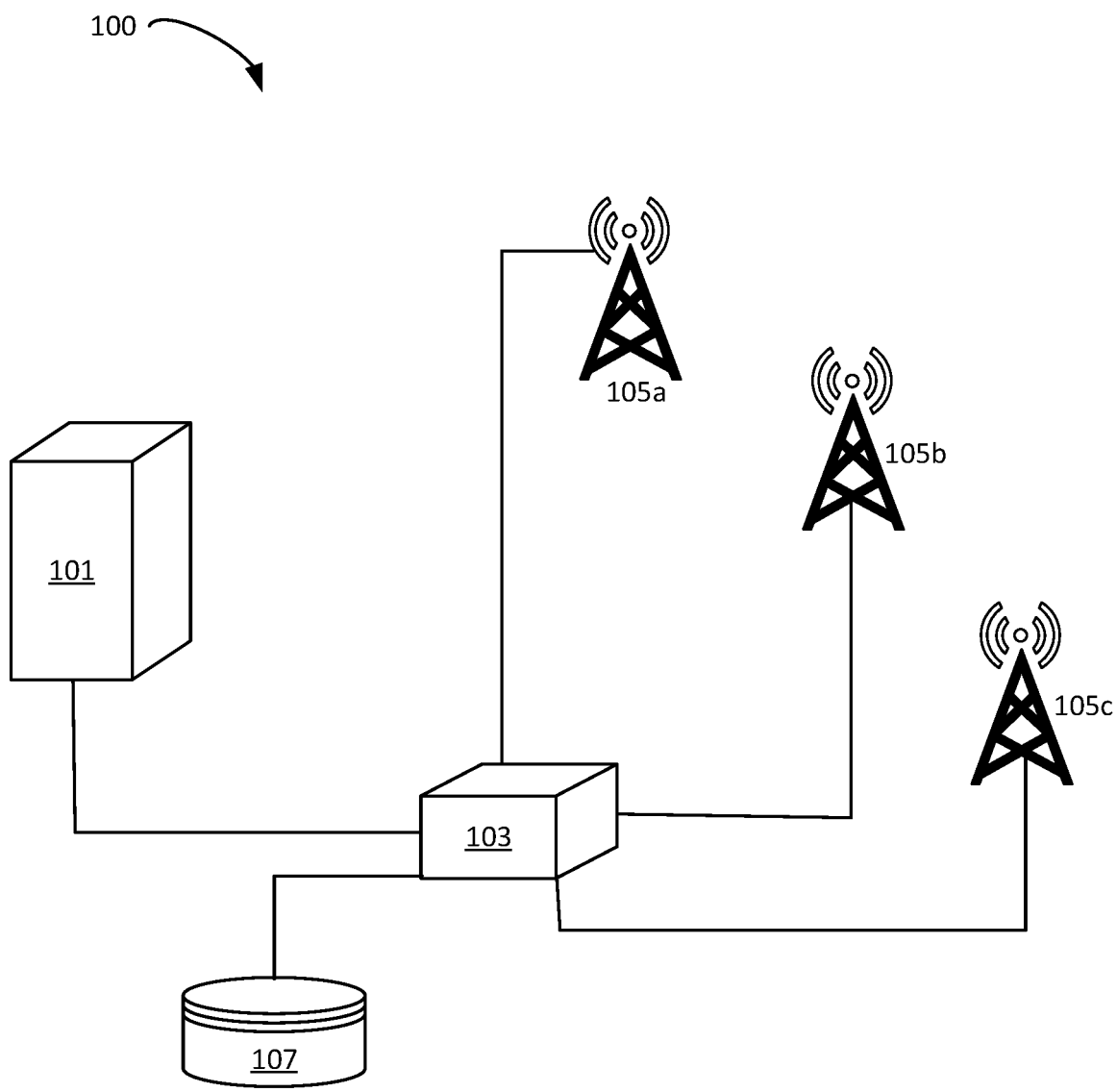
FIG. 1 is a schematic diagram illustrating an example of a telecommunications network.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "network node" is used in a non-limiting manner and, as explained below, can refer without limitation to any type of network node in a telecommunications network performing a new RAN slice feasibility check including, without limitation, an gNodeB. As used herein, a "RAN slice" refers to a part of a network slice for a RAN domain. For example, in relation to 3GPP TS 28.530 V16.4.0, a "RAN slice" refers to a Network Slice Subnet for a RAN domain. As used herein, a "feasibility check" refers to determining whether the capacity of current RAN resources is sufficient to carry the traffic from a new RAN slice, given certain performance requirements. The term "feasibility check" can also be referred to as a RAN slice admission control process. As used herein, a feasibility check of a new RAN slice can be broken down as a determination on cell or sub-cell level. As used herein, "sub-cell" refers to the resources assigned to a level more granular than a cell, e.g., a transmission point. As used herein, "cell" is used to denote both cell and sub-cell levels.

The following explanation of potential problems with some approaches is a present realization as part of the present disclosure and is not to be construed as previously known by others.

While support for network slicing (e.g., identifiers, functions, signaling) is already defined in the latest Third Generation Partnership Project (3GPP) TS 28.530 Release 17, specifications, solutions for efficient automated management of network slicing (e.g., automatic provisioning of slices) are still at an infancy stage, including for a next-generation Radio Access Network (NG-RAN). See e.g., Oscar Adamuz-Hinojosa, Pablo Munoz, Pablo Ameigeiras, Juan M. Lopez-Soler, "Sharing gNB components in RAN slicing: A perspective from 3GPP/NFV standards," in 2019 IEEE Conference on Standards for Communications and Networking (CSCN), 2019.

Although a network slice may belong to a URLLC, a mMTC, or an eMBB category, network slice requests are yet to be standardized and may not be discretely defined. RAN slices might be initiated by operators. It may be desirable for a new RAN slice feasibility check process to intelligently consider a RAN slice request and determine its fitness to meet the predefined objectives.

In order to accept another slice in RAN, it may be beneficial for the radio capacity of cells in an associated network node (e.g., a gNodeB) and also their hardware processing capacity to be enough to provide a requested quality of service (QOS). In an approach, the amount of required radio resources for a given slice can be taken as an input parameter with assumption of fixed capacity per cell. However, the variability in the radio propagation and interference conditions experienced by the users when operating in different cells (such as, indoor, urban, rural environments, etc.), the cell location, the cell deployment (e.g., cell radius, transmitted power, frequency of operation, bandwidth, modulation, number of antennas, number of available physical resource blocks (PRBs), current cell load, etc.) together with diverse users' mobility patterns can strongly affect the cell's capacity and, as a result, the amount of required radio resources to support a given RAN slice.

In some approaches, the design of a new RAN slice feasibility check process may be based on a specific strategy. In some approaches, a strategy may be random, greedy, semi-greedy, priority-based, or simply first-come-first-served or optimal. Whichever is the strategy used, a goal is to achieve an objective defined by the slice operator. See e.g., Mourice O. Ojijo, Olabisi E. Falowo, "A Survey on Slice Admission Control Strategies and Optimization Schemes in 5G Network," *IEEE Access*, vol. 8, pp. 14977-14990, 2020.

In some approaches, strategies may be derived in different ways through an expert acquainted with cell planning, or any optimization or analytical algorithmic solution.

One approach uses a strategy derived through a manual operation in cell planning. For this strategy, a radio expert may manually investigate and analyze cell properties in conjunction with a targeted (i.e., new) slice to be added in order to arrive at a decision. Such manual work, however, may be time consuming and less accurate compared to taking measurements. Furthermore, expected outcomes depend on individual experience of the radio experts performing the cell planning.

Another approach may use a strategy based on analytical models. For example, for analytical based system model assumptions, e.g., a Markov model or an analytics-based model, solutions may derive relevant analytical formula and a new RAN slice feasibility check decision for a new RAN slice. Examples for this type of approach may include, e.g., Bin Han, Di Feng, Hans D. Schotten, "A Markov Model of Slice Admission Control," *IEEE Networking Letters*, vol. 1, p. 2-5, 2019 and I. Vila, J. Perez-Romero, O. Sallent, A. Umbert, R. Ferrus, "Performance Measurements-Based Estimation of Radio Resource Requirements for Slice Admission Control," in *IEEE 90th Vehicular Technology Conference*, Honolulu, 2019. Such an approach, however, may have limitations on the assumptions the approach is built on. Real RAN deployments are very complex and interconnected system; and assumptions, e.g., memoryless models (Markovian), generally may not hold in practice.

Various embodiments of the present disclosure may provide solutions to these and other potential problems. In various embodiments of the present disclosure, a method for a new RAN slice feasibility check is provided. The method determines whether the capacity of current RAN radio resources and/or hardware processing resources is sufficient to carry the traffic from a new RAN slice, given certain performance requirements.

As used herein with respect to various embodiments of the present disclosure, an amount, capacity, or utilization of a "radio resource" refers to how a radio resource is/has been utilized in relation to the capacity to deploy a new RAN slice. In some embodiments of the present disclosure, a radio resource includes a PRB utilization, a number of radio resource control (RRC) connected users, a data radio bearer (DRB) volume, etc. The term "radio resource" herein may be interchangeable and replaced with "resource".

Some embodiments include a RAN slice with a long/large lifetime, e.g., days, weeks, months, etc. In such embodiments, historical radio resource utilization and traffic for large time scale are representative of future values.

Various embodiments of the present disclosure include a method for a feasibility check of a new RAN slice that takes into account the dynamic nature of radio and processing capacity of a cell within a network node, e.g., a gNodeB. The method uses data collected in the network node, e.g., a gNodeB, to determine whether a new RAN slice can be admitted. RANs are data-rich environments, where data is continuously gathered in the form of radio measurements or other system observations by thousands of user devices and network entities; and the data collected includes such data.

In various embodiments of the present disclosure, calculating the dynamic nature of cell capacity uses available data collected in the gNodeB in the cell. Mobile networks generate a large amount of information that can be used in measurement based replanning and optimization tasks. In the radio access domain, such information can be classified into:
 1. Configuration Management (CM) information, including network parameter settings.
 2. Performance Management (PM) information, including counters that collect aggregated measurements reflecting the performance of network elements or groups of user equipment (UE). These counters can be used to compute network Key Performance Indicators (KPI).
 3. Traffic Recordings (TR), also referred to as management-based tracing (see e.g., "Telecommunication management; Subscriber and equipment trace; Trace concepts and requirements," 3GPP TS 32.421 V16.1.0), collecting signaling messages exchanged between the different network nodes. TR includes, e.g., anonymously, events and measurements of a pre-established percentage of connections in a cell and/or with events and measurements for a specific user.

The term "communication device" is used in a non-limiting manner and, as explained below, can refer to any type of UE. The terms "user equipment", "UE", and/or "user" herein may be interchangeable and replaced with the term "communication device".

Trace files can be binary files containing signaling events. The structure of signaling events can include a header with general attributes (e.g., timestamp, network node, user equipment, event type or event length, etc.) and a message container including different attributes (a.k.a. event parameters). Events can include vendor-dependent internal events, generated inside the base stations for monitoring purposes, and standardized external events, corresponding to messages exchanged between network nodes. Event decoding can be performed by a parsing tool that extracts the information contained on fields per event type, network node and reporting period. Then, traces can be synchronized by merging files from different nodes. Measurement data can be a valuable source of information for decision making or predicting a value within many functionalities in the RAN.

Potential advantages provided by various embodiments of the present disclosure may include increased accuracy and flexibility as compared to an expert knowledge domain. For example, decisions may be more accurate and may not be dependent on human experience, but rather take into account time aspects, traffic, available radio resources, and processing powers, etc. Further potential advantages may include providing an automated method that considers the dynamic nature of a network, including e.g., for a long term, in performing a new RAN slice feasibility check; and efficient use of radio resources and processing resources available. Such an automated method may save time and engineering efforts, which may lead to a reduction in operating costs, in comparison to manual operations.

FIG. 1 is a schematic diagram illustrating an example of a telecommunications network, e.g., a 4G or a 5G RAN. Telecommunications network 100 includes core network 101 (e.g., a 5G core or an evolved packet core (EPC)), network node 103 (e.g., a gNodeB), radio units (RUs) 105a, 105b, 105c (also referred to herein as "cells"), and offline updates 107. Network node 103 includes a processing circuitry that controls RUs (cells) 105a, 105b, 105c, etc. While the components in FIG. 1 include a depiction of one network node and three RUs, in practice, multiple network nodes and/or a number of RUs greater than or less than three may be included. The network node processing circuitry may be a baseband unit, and the RUs (cells) may be radio units and adherent antennas. Moreover, there may be more than one RU per cell (not illustrated in FIG. 1). Additionally, network node 103 and RUs 105 may be virtual and deployed in a cloud environment having associated interfaces to components of the telecommunications network; or network node 103 and RUs 105 have network functions (e.g., a management system functions, feasibility check functions, etc.) deployed in a cloud environment and having associated interfaces to components of the telecommunications network (not illustrated in FIG. 1). In some embodiments, cells 105a, 105b, 105c, etc. are NR cells and network node 103 is a gNodeB. The processing circuitry for a gNodeB 103 can run a data collection process and machine learning (ML) process to predict the resource demand for a new RAN slice for a specific cell 105a, 105b, 105c, etc. The connection of a gNodeB 103 to the core network 101 can ensure that user and control services and traffic are transmitted in both sides (uplink and downlink).

Figure 2:
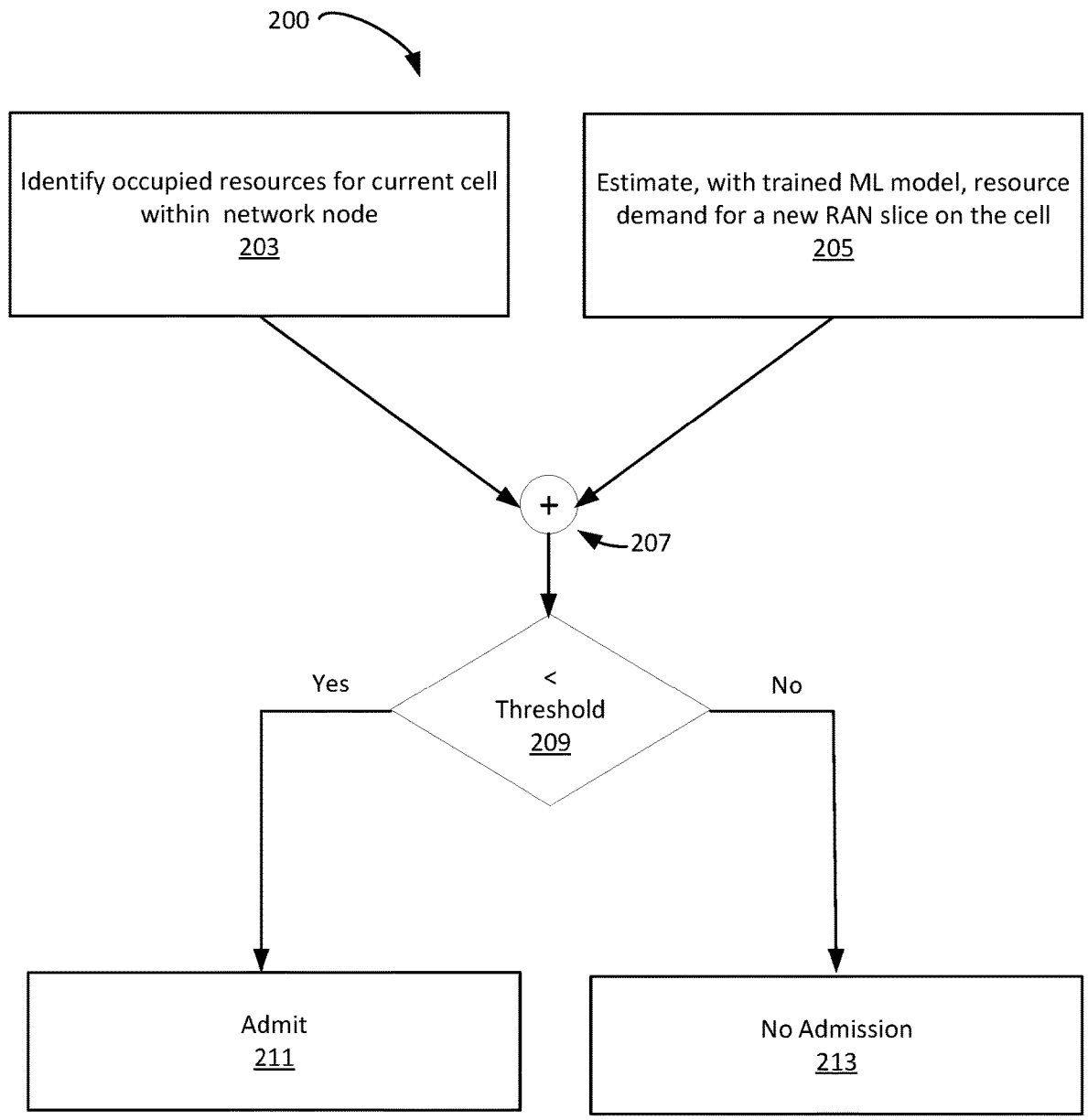
FIG. 2 is a flowchart of a method in accordance with some embodiments of the present disclosure.

FIG. 2 is a flowchart of a method 200 in accordance with some embodiments of the present disclosure. Referring to block 203, from measured data in different time intervals, the occupied resources in a current cell (e.g., cell 105a) within a network node (e.g., network node 103) are identified. Referring to block 205, a trained ML model estimates required resource demand for a new RAN slice on the cell (e.g., cell 105a). At operation 207, the identified occupied resources and the resource demand in the current cell are summed. At 209, a determination is performed based on comparing the sum from 207 with a threshold value to determines whether the new RAN slice should be admitted 211 or not admitted 213.

Data collection and preparation for training ML models is now discussed.

Figure 3:
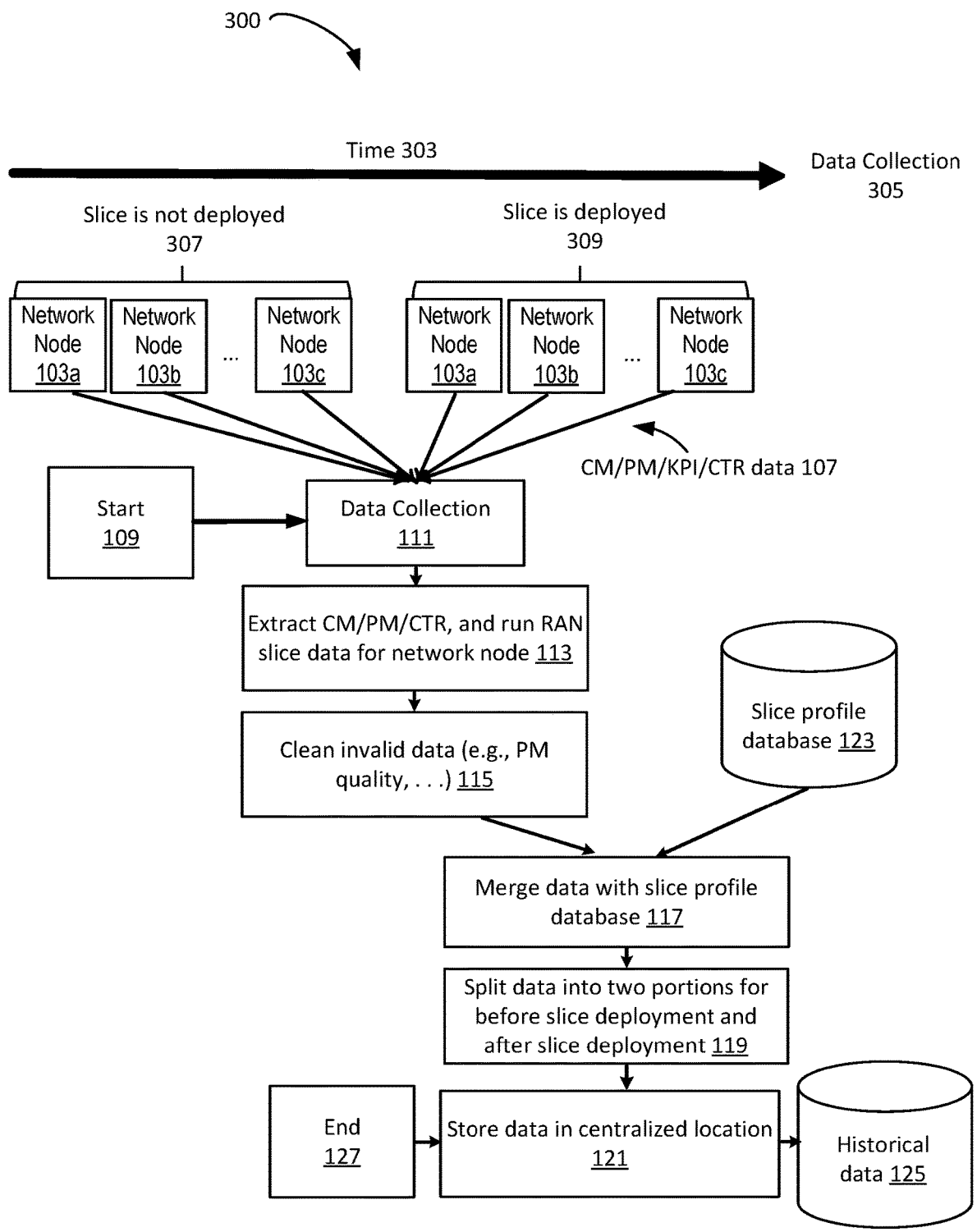
FIG. 3 is schematic diagram illustrating data collection and operations to prepare training a machine learning model in accordance with some embodiments of the present invention.

FIG. 3 is schematic diagram illustrating data collection and operations 300 to prepare training a ML model in accordance with some embodiments of the present invention.

A prerequisite for ML training can include access and preparation of data relevant to a problem. In some embodiments, relevant data includes historical data including information about the RAN configuration, performance, and a RAN slice profile, collected from an actual RAN slice deployment in the field. In some embodiments, the RAN slice profile can be defined by the slice profile related to a network slice subnet for a radio access network (RAN), as defined in 3GPP TS 28.541, V16.7.0.

Referring to FIG. 3, historical data is collected 305 over a time period 303, including for a RAN slice (S) that is not deployed 307 on a cell for network nodes 103a, 103b, 103c, etc.; and for the RAN slice (S) that is deployed 309 on a cell for network nodes 103a, 103b, 103c, etc. Operations for data collection and preparation for training ML models starts 109 at operation 111 to collect data from network nodes 103a-103c, etc. The collected data 107 includes CM, PM, KPI, and/or CTR data. In operation 113, an agent (e.g., software) is executed that performs raw data collection for each network node (e.g., each gNodeB) and its corresponding cells (e.g., NR cells) from production networks. In operation 113, CM, PM, KPI, and/or CTR data is extracted, and RAN slice data is run for the network nodes. Additionally, or any other source of related data from the raw data may be extracted using parsers.

Still referring to FIG. 3, at operation 115, the extracted data is cleaned. In some embodiments, data cleaning can deal with PM data, e.g., PM quality. Data cleaning may include computing a PM data quality metric (e.g., pm_quality=rop_count/(4*24*7*cell_count), where rop_count refers to the number of Reporting Output Period (ROP) and cell_count refers to the number of cells associated with each data point. Only a portion of the data points may be kept, e.g., data points having a pm_quality of at least 0.90, e.g., at least 90% of ROPs are collected. Such data cleaning may ensure that the collected data is reliable. In another example embodiment, data cleaning may be performed on CTR data. In this example embodiment, each feature is extracted based on their event identifier (ID) that they are reported in, which may then be grouped based on a cell ID and a per defined time granularity for a problem in hand. Some features can be incorporated as is, but some features may be a feature engineered to certain quantile values, e.g., signal-to-noise and interference ration (SINR) can be used to 10, 50, 90 percentiles. This stage of data cleaning is not limited to CM and PM or CTR data, and can include part of any raw data.

A slice profile database 123 (or memory or other storage) includes a RAN slice profile describing a RAN slice property or properties, e.g., such as a requirement on the RAN slice profile. The RAN slice property can include an upper bound for the property, or a prior expectation about the RAN slice. In some embodiments, the RAN slice profile includes a specified quality of service class identifier, QCI; a specified 5G quality of service class identifier, 5QI; a maximum number of UEs; latency; throughput; etc. It is noted that, in this context, latency refers to RAN latency (between UEs and a network node) not end-to-end network latency.

At operation 117, for each RAN slice, the data from operation 115 is joined with data from the slice profile database 123. For each RAN slice that has been run on the cell in the network nodes, their RAN slice profiles known prior to execution are obtained.

ML training uses data from actual RAN slice deployment to preprocess and train a ML model(s) on. At operation 119, the merged data from operation 117 is split into two parts: before slice deployment ($D_{before}$) and after slice deployment ($D_{after}$) for a training phase in order to capture the demand for that particular RAN slice.

At operation 121, the split data from operation 119 is stored in a centralized location, e.g., database 125 of historical data located at a centralized location. At operation 127, the data collection and preparation for training a ML model(s) ends.

The following table summarizes notations referred to in some embodiments of the present disclosure:

| Notation | Description |
|---|---|
| G | A particular gNodeB |
| C | A NR cell within gNodeB G |
| S | A new RAN slice S being deployed to cell C and network node G |
| R | A set of resources within G and C. Example embodiments include, but are not limited, to a hardware resource, a processing resource and a radio resource |
| I | A set of time intervals for measuring resource utilization for RAN slice feasibility check decisions. Examples embodiments are provided herein |
| $D_{before}$, $D_{after}$ | Data captured before the RAN slice S in cell C; and data captured after the RAN slice S is deployed in cell C, respectively |
| U(r, i) | Occupied resource for each resource r (in R) and each time interval i (in I) |
| D(r, i) | Estimate of resource demand D(r, i) for each resource r (in R) and interval i (in I) |

Training of a ML model to estimate RAN slice resource demand at a particular time interval is now discussed.

Figure 4:
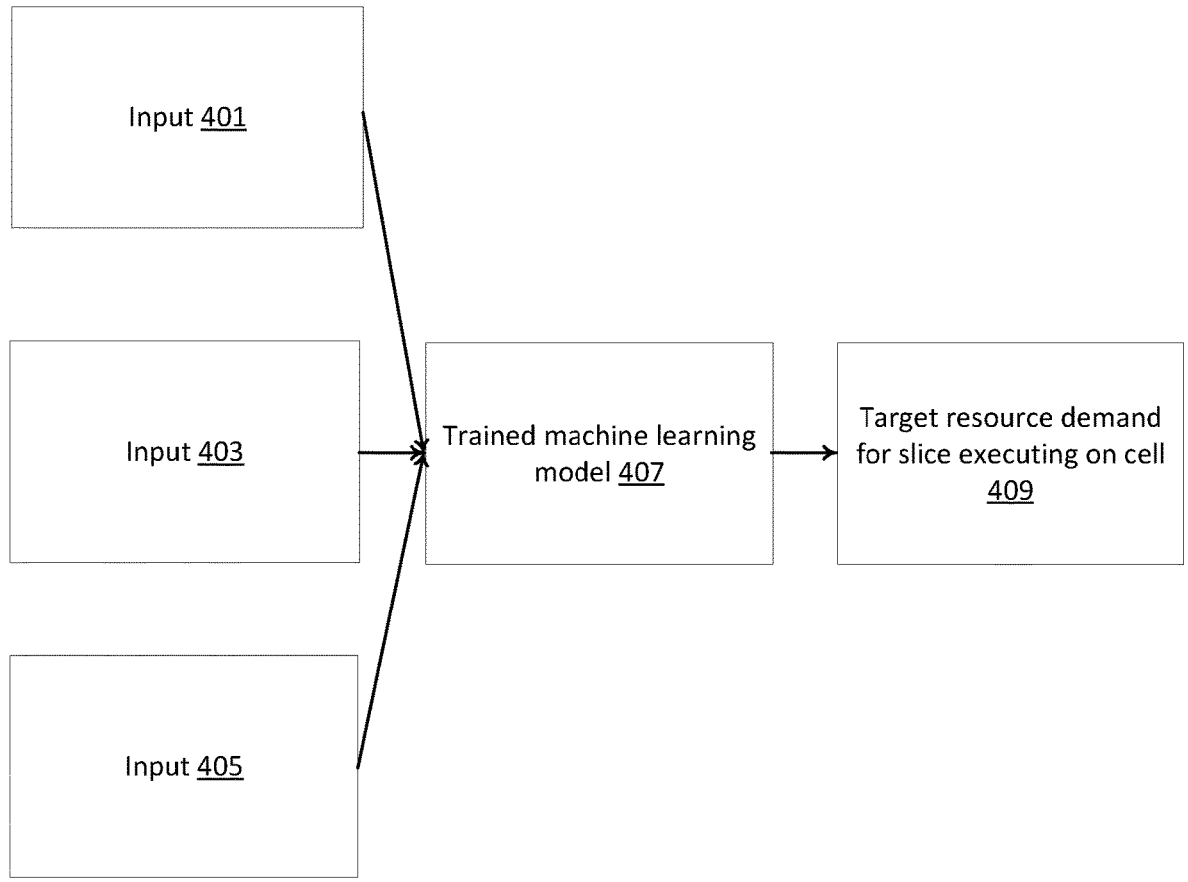
FIG. 4 is block diagram illustrating training of a machine learning model to estimate resource demand of a new RAN slice executing on a cell in a network node in accordance with some embodiments of the present disclosure.

FIG. 4 is block diagram illustrating training of a ML model to estimate new resource demand of a RAN slice S executing on a cell (e.g., a NR cell) in a network node (e.g., a gNodeB G) in accordance with some embodiments of the present disclosure.

A set of resources (R) exists for executing RAN slices within a cell (C) and a gNodeB (G). Example embodiments of such target resources include, without limitation, (1) hardware resource demand, (2) processing resource demand, and (3) radio resource demand, etc. In various embodiments, resource utilization for a new RAN slice feasibility check decision is measured for a set of time intervals (I). Example embodiments of I include: 1, 2, 3, . . . , 30 days; rush hours and an hour sampled in a day; day and night; weekdays and weekends and holidays, etc. Measurement of resource utilization for a new RAN slice feasibility check decision at different time intervals may capture different time intervals of resource demands and utilization.

Referring to FIG. 4, inputs 401-405 of a ML model (that is, "input features" in ML terminology) for a training process include:
(1) extracted properties 401 from a RAN slice profile of a RAN slice (S), including e.g., expected traffic (e.g., maximum number of UEs per slice, etc.); a QoS requirement (e.g., latency, throughput, QCI/5QI); etc.;
(2) extracted properties 403 from a cell C, e.g., UE related information (e.g., average number of RRC connected users per cell volume of DRB, etc.); user geographical distribution properties (e.g., tracking area (TA), number of users at cell borders, average path loss, inter-site distance (ISD), etc.); activity factors (e.g., burstiness of traffic, etc.); etc.;
(3) extracted properties 405 of gNodeB (G), e.g., hardware characteristics (e.g., hardware models, etc.); software version; operating system version; reference signal received power (RSRP), reference signal received quality (RSRQ); signal to interference noise ratio (SINR), channel quality information (CQI), rank indicator (RI); throughput, latency; etc.

ML model 407 is trained using inputs 401-405 to predict RAN slice resource demand for a resource r in a time interval i. Output 409 (e.g., a target variable) of the ML model 407 is a resource r identified in a set of limited resources R in the gNodeB G and cell C.

In one embodiment, the output 409 is an average hardware resource demand per user (%). In another embodiment, the output 409 is the radio resource demand usage for executing a RAN slice on a particular cell. In another embodiment, the output 409 is any combination of R. While examples of output 409 include processing, memory, and radio resource utilization, the output 409 can include any other resources R that can be are limited such as memory bus, available spectrum, etc.

In various embodiments, data collection and selection (discussed herein) can provide a large number of pairs of input 401-405 and output 409 in order to apply machine learning in order to derive this relationship. Note that, in a training process, a lot of data may be needed about possible future combinations of cell configurations and RAN slice profiles to build a meaningful ML model. However, training does not always have to start from scratch. In some embodiments, trained data can be reused from another part of the network with similar cell/site/traffic properties. As used herein, similar cell/site/traffic properties refers to that they have a similar distribution of input 401-405.

Referring now to FIGS. 3 and 4, in an example embodiment, operations for output 409 from raw data, e.g., average hardware resource demand for RAN slice S executing on cell C (e.g., in percentage (%)), include the following:
(1) From operation 119 there are two data sources including data captured before the RAN slice S is deployed ($D_{before}$) and the data recorded after the RAN slice S is deployed ($D_{after}$).
(2) Average hardware processing resource utilization, $HW_{utilization}$, can be measured by performance counters in the gNodeB, e.g., "pmLicUICapDistr (%)" shows the utilization of uplink (UL) baseband capacity relative to the minimum of installed license for UL baseband capacity or hardware capacity limit; which is expressed as percentage of the minimum of license limit or hardware capacity limit.
(3) A delta of hardware processing resource utilization (%) is computed of the difference between $HW_{utilization}$ in $D_{after}$ and $HW_{utilization}$ in $D_{before}$.

In another embodiment, the resource demand R can be related to radio resources. The operation of radio resource demand can be calculated as referenced in FIG. 4, where the input 401-405 to the ML model 407 is similar to that in the above hardware utilization embodiment. This embodiment considers features from three categories namely, cell C radio environment (such as, load and geographical information, etc.), cell C radio condition (such as, quality of service type of measurement, cell and user performance, etc.), and the expected RAN slice profile of RAN slice S. The same computational operations discussed with respect to $HW_{utilization}$ can be applied to drive the radio resource demands. In some embodiments, radio recourse demands as an output include, without limitation:

In some embodiments, the output 409 is a PRB demand percentage which is (1−(Available PRB/total number of PRBs in the cell))*100. PRB scales with traffic volume, which depends on the number of users and QoS. The available PRB is available in a cell level from PM counters and a total number of PRB depends on the available Bandwidth in cell. This metric can be per QCI/5QI.

In another embodiment, the output 409 is RRC connected users (which scales with number of users) can be a representation of the demand. This metric can be per QCI/5QI as well if the measurement is available.

In another embodiment, DRB volume is the output 409, which can be derived from PM counters. This metric can be per QCI/5QI if the measurement is available.

In another embodiment, radio resource demand percentage can be calculated following a similar approach to hardware utilization. Radio resource demand percentage can be calculated before and after RAN slice S is deployed in a training phase to find the difference in radio resource demand (e.g., PRB percentage or RRC connected users or DRB volumes) in $D_{after}$ and radio resource demand (e.g., PRB percentage or RRC connected users or DRB volumes) in $D_{before}$.

ML models will now be discussed. Various embodiments include a supervised ML model for a training process. In some embodiments, the ML model is a neural network, an artificial neural network (ANN), a random forest, or a recurrent neural network (RNN), etc.

Application of a trained ML model for a new RAN slice feasibility check will now be discussed.

Figure 5:
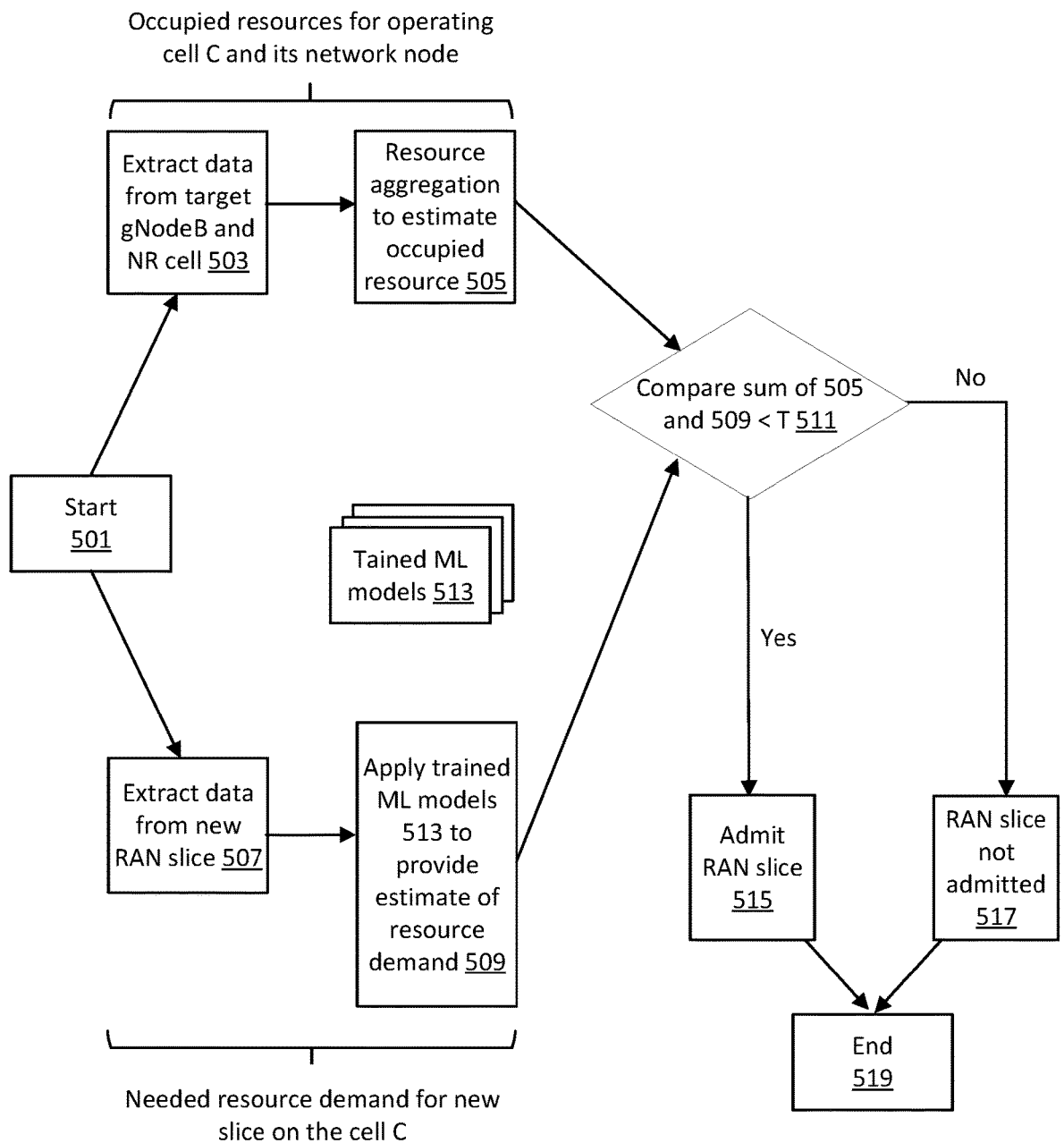
FIG. 5 is a flowchart illustrating application of a trained ML model for a RAN slice feasibility check in accordance with some embodiments of the present disclosure.

FIG. 5 is a flowchart illustrating application of a trained ML model for a new RAN slice feasibility check in accordance with some embodiments of the present disclosure.

Referring to FIG. 5, the process starts 501. In operation 503, data is extracted from a target operational (e.g., live) gNodeB G and NR cell C. The extracted data includes data regarding the resources, such as radio and hardware resource data.

In operation 505, resource aggregation is performed to estimate the occupied resource U(r, i) (e.g., in percentage (%)) for each resource r in a plurality of resources (R) and each time interval i in a plurality of time intervals (I).

In operation 507, data from a new RAN slice S is extracted to be evaluated for a new RAN slice feasibility check. The extracted data for the new RAN slice S includes, but is not limited to, a RAN slice profile, radio condition, and total number of expected UEs per given QCI/5QI for new slice if available. For the distribution of UEs to each cell, existing traffic (or history) in the measurements may be used. If that information is not available, explicit knowledge of the geographical distribution defined by site engineers can be used.

In operation 509, trained ML models 513 are applied to provide an estimate of resource demand D(r, i) for each limited resource r in R and interval I in I for the new RAN slice S.

Blocks 513 each refer to a trained supervised ML model, respectively, for predicting RAN slice resource demand for resource r in time interval i.

In operation 511, a comparison is performed considering resource utilization from operation 505 and the new RAN slice resource demand from operation 509, respectively. The comparison includes determining whether the sum U(r, i)+D(r, i)<a defined threshold (T(r)) for all resources r in R and each time interval i in I. If the aggregation of the occupied resources and estimated resources demand does not exceed the defined threshold T (e.g., set by the operator), the RAN slice S is admitted 515. In some embodiments, defined threshold T can represent a capacity with a safety margin which may be derived from a confidence level required by an operator; and/or can be derived from measurements or capacity by the operator.

Moreover, if U(r, i)+(D(r, i)>T(r), the RAN slice S is not admitted 517 (or in other words is considered to be rejected).

Still referring to FIG. 5, in an example embodiment, a single resource R is considered where |R|=1. In this embodiment, the single resource is PRB utilization, with three time intervals |I|=3, where I={1 day, 3 days, 5 days}. Block 513 includes three trained ML models trained using |R|*|I|: (1) PRB utilization demand for 1 day; (2) PRB utilization demand for 3 days; and (3) PRB utilization demand for 5 days.

In operation 505, in this embodiment, three measurements of PRB utilization are taken of PRB utilization: 1 day, 3 days, and 5 days to estimate the occupied resources (i.e., having 3 U(r,i)). For a new RAN slice S, the trained ML models are applied operation 509 to data extracted from the new RAN slice S in operation 507, and three predicted PRB utilization for 1 day, 3 days, and 5 days (i.e., having 3 D(r,i)) are obtained. In operation 511, three comparisons are performed for each time interval to determine whether each time interval meets the following condition: U(r,i)+D(r,i)<T(r) (3 comparisons) in order to take the decision whether to accept the new RAN slice or not.

Figure 6:
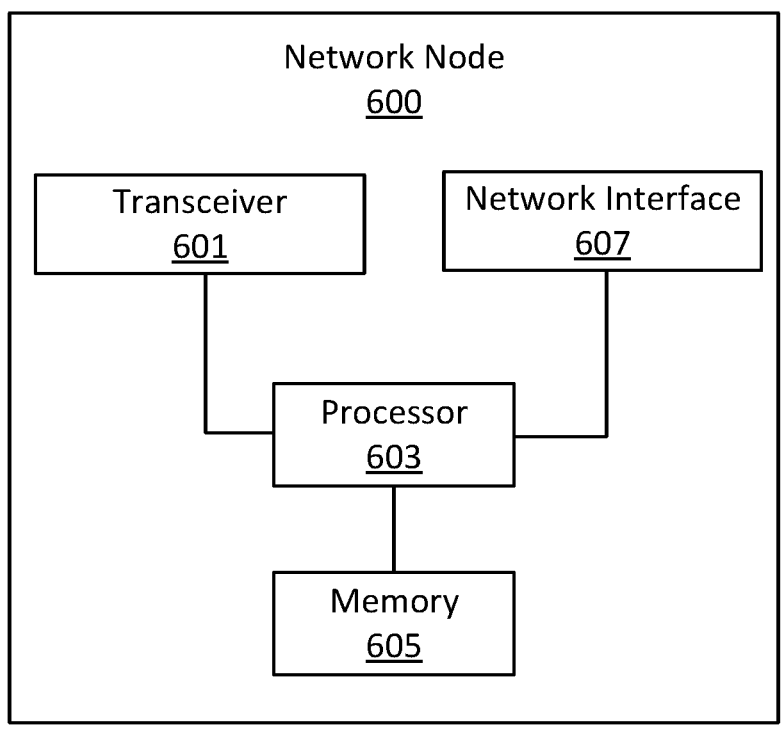
FIG. 6 is a block diagram illustrating a network node in accordance with some embodiments of the present disclosure.

Now that the operations of the various components have been described, operations specific to a network node 103 (implemented using the structure of the block diagram of FIG. 6) in a telecommunications network for performing a method for a new RAN slice feasibility check will now be discussed with reference to the flow charts of FIGS. 7-9 according to various embodiments of the present disclosure. As shown, network node 600 may include network interface circuitry 607 (also referred to as a network interface) configured to provide communications with other nodes of the network, communication devices, and/or the RAN. Network node 600 may also include a processing circuitry 603 (also referred to as a processor) coupled to the network interface circuitry, and memory circuitry 605 (also referred to as memory) coupled to the processing circuitry 603. The memory circuitry 605 may include computer readable program code that when executed by the processing circuitry 603 causes the processing circuitry 603 to perform operations. Further, modules may be stored in memory 605, and these modules may provide instructions so that when the instructions of a module are executed by respective computer processing circuitry of processor 603, processing circuitry of processor 903 performs respective operations of the flow charts of FIGS. 7-9 according to embodiments disclosed herein.

Each of the operations described in FIGS. 7-9 can be combined and/or omitted in any combination with each other, and it is contemplated that all such combinations fall within the spirit and scope of this disclosure.

Referring to FIG. 7, a method for a feasibility check of a new RAN slice performed by a network node in a telecommunications network is provided. The method includes computing (701) a first estimate of occupied resources for each resource within at least one of the network node and a cell of the network node. The first estimate is performed for each resource in each interval of time in a plurality of intervals of time using historical data of a measurement of utilization of each resource. The method further includes applying (703) a trained supervised machine learning model to provide a second estimate of resource demand for each resource in each interval of time in the plurality of intervals of time for the new RAN slice. The method further includes comparing (705) a sum of the first estimate and the second estimate for each interval of time and each resource to a defined threshold value. The method further includes admitting (807) the new RAN slice when the sum for each interval of time has a value not greater than the defined threshold value per resource.

Referring now to FIG. 8, in some embodiments, the method further includes rejecting (813) the new RAN slice when the sum for an interval of time in the plurality of intervals of time has a value greater than the defined threshold value.

In some embodiments, the each resource includes at least one of a hardware resource, a processing resource, and a radio resource.

In some embodiments, the historical data includes at least one of configuration management information, performance management information, and traffic recordings for a plurality of network nodes in the telecommunications network.

In some embodiments, the method further includes extracting (803) (i) the historical data from at least one of the network node and at least one cell of the network node, and (ii) data from the new RAN slice, the data including a RAN slice profile.

In some embodiments, the RAN slice profile for the new RAN slice includes data including a performance requirement for a communication device per at least one of (i) a single network slice selection assistance indicator, S-NS-SAI, (ii) a specified quality of service class identifier, QCI, and (iii) a specified 5G quality of service class identifier, 5QI.

In some embodiments, the method further includes collecting (801) historical data for each of a plurality of network nodes and each of a corresponding cell for each of a plurality of network nodes in a live telecommunications network.

In some embodiments, the method further includes identifying (805) the historical data providing a value for each resource and each time interval; and merging (807), into merged data, the identified historical data with a plurality of the RAN slice profiles, each historical data being associated with a historical RAN slice and a corresponding RAN slice profile.

In some embodiments, the method further includes dividing (809) the merged data into two portions of divided data including a first portion of data from the merged data prior to deployment of the historical RAN slice, and a second portion of data from the merged data subsequent to deployment of the historical RAN slice.

In some embodiments, the method further includes storing (811) the divided data in a centralized location.

Referring now to FIG. 9, in some embodiments, the method further includes training (901) the supervised machine learning model to estimate resource demand for a new RAN slice for the telecommunications network across a plurality of network nodes and cells within the plurality of network nodes. The estimate is performed for each resource in each interval of time in the plurality of intervals of time using a historical measurement of characteristics from the at least one RAN slice across a plurality of network nodes and cells within the plurality of network nodes, each historical measurement related to a historical RAN slice profile, and a RAN slice profile. The measurement has two data sources including a first data measurement recorded before a historical RAN slice is deployed and a second data measurement recorded after the historical RAN slice is deployed.

In some embodiments, the training includes inputting data to the supervised machine learning model. The data includes input features including (i) first data describing a property and a characteristic of the RAN slice profile; (ii) second data describing a property and a characteristic of the network node; and (iii) third data describing a property and a characteristic of a cell of the network node function. The method further includes estimating the resource demand for a new RAN slice for the telecommunications network for the cell of the network node and the network node using the input features. The method further includes outputting a variable. The variable includes the estimated resource demand related to the new RAN slice executing on the network node and the cell.

In some embodiments, wherein the telecommunications network includes a 5th generation RAN, the network node is a gNodeB network node, the cell is a radio cell of the gNodeB, and the RAN slice is a network slice subnet for the RAN.

Various operations from the flow chart of FIGS. 8 and 9 may be optional with respect to some embodiments of a method performed by a network node, and related methods. For example, operations of blocks 801-813 of FIG. 8 and block 901 of FIG. 9 may be optional.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNodeBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a network node having cloud-based functions (e.g., a virtual network node deployed in a cloud environment or a network node having functions (e.g., a management system) deployed in a cloud environment as described herein. More generally, however, network nodes may represent any suitable device (or group of devices) capable, configured, arranged, and/or operable to enable and/or provide a wireless device with access to the wireless network or to provide some service to a wireless device that has accessed the wireless network.

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method for a feasibility check of a new radio access network (RAN) slice performed by a network node in a telecommunications network, the method comprising:
computing a first estimate of occupied resources for each resource within at least one of the network node and a cell of the network node, the first estimate performed for each resource in each interval of time in a plurality of intervals of time using historical data of a measurement of utilization of each resource;
determining a second estimate of resource demand for each resource in each interval of time in the plurality of intervals of time for the new RAN slice using a trained supervised machine learning model;
determining whether to admit the new RAN slice based on a comparison of a sum of the first estimate and the second estimate for each interval of time and each resource to a corresponding defined threshold value per resource; and admitting the new RAN slice when, for each resource and for each interval in the plurality of intervals, the sum of the first estimate and the second estimate has a value that does not exceed the corresponding defined threshold value.

2. The method of claim 1, further comprising:
rejecting the new RAN slice based on the sum of the first estimate and the second estimate for an interval of time in the plurality of intervals of time having a value greater than the corresponding defined threshold value.

3. The method of claim 1, wherein each resource comprises at least one of:
a hardware resource;
a processing resource; and
a radio resource.

4. The method of claim 1, wherein the historical data comprises at least one of:
configuration management information for a plurality of network nodes in the telecommunications network;
performance management information for the plurality of network nodes in the telecommunications network; and
traffic recordings for the plurality of network nodes in the telecommunications network.

5. The method of claim 1, further comprising:
extracting the historical data from:
at least one of:
the network node; and
at least one cell of the network node; and
data for the new RAN slice, the data including a RAN slice profile.

6. The method of claim 5, wherein the RAN slice profile for the new RAN slice comprises data including a performance requirement for a communication device per at least one of:
a single network slice selection assistance indicator (S-NSSAI);
a specified quality of service class identifier (QCI); and
a specified 5G quality of service class identifier (5QI).

7. The method of claim 1, further comprising:
collecting historical data for each of a plurality of network nodes and each of a corresponding cell for each of the plurality of network nodes in a live telecommunications network.

8. The method of claim 7, further comprising:
identifying the historical data providing a value for each resource and each interval of time in the plurality of intervals of time; and
merging, into merged data, the identified historical data with a plurality of RAN slice profiles, each historical data being associated with a historical RAN slice and a corresponding RAN slice profile.

9. The method of claim 8, further comprising:
dividing the merged data into two portions of divided data comprising a first portion of data from the merged data prior to deployment of the historical RAN slice, and a second portion of data from the merged data subsequent to deployment of the historical RAN slice.

10. The method of claim 9, further comprising:
storing the divided data in a centralized location.

11. The method of claim 1, further comprising:
training the supervised machine learning model to estimate resource demand for a new RAN slice for the telecommunications network across a plurality of network nodes and cells within the plurality of network nodes, the estimate performed for each resource in each interval of time in the plurality of intervals of time using a historical measurement of characteristics from at least one RAN slice across a plurality of network nodes and cells within the plurality of network nodes, each historical measurement related to a historical RAN slice profile, the cell, and a RAN slice profile, the measurement having two data sources including a first data measurement recorded before a historical RAN slice is deployed and a second data measurement recorded after the historical RAN slice is deployed.

12. The method of claim 11, wherein training the supervised machine learning model comprises:
inputting data to the supervised machine learning model, the data comprising input features including:
first data describing a property and a characteristic of the at least one RAN slice profile;
second data describing a property and a characteristic of the network node; and
third data describing a property and a characteristic of a cell of the network node;
estimating the resource demand for the new RAN slice for the telecommunications network for the cell of the network node and the network node using the input features; and
outputting a variable, the variable comprising the estimated resource demand related to the new RAN slice executing on the network node and the cell.

13. The method of claim 1, wherein the telecommunications network comprises a 5th generation RAN,
wherein the network node is a gNodeB network node,
wherein the cell is a radio cell of the gNodeB, and
wherein the RAN slice is a network slice subnet for the RAN.

14. A network node in a telecommunications network, the network node comprising:
processing circuitry; and
memory coupled with the processing circuitry, wherein the memory includes instructions that when executed by the processing circuitry causes the network node to perform operations for a feasibility check of a new radio access network (RAN) slice, the operations comprising:
computing a first estimate of occupied resources for each resource within at least one of the network node and a cell of the network node, the first estimate performed for each resource in each interval of time in a plurality of intervals of time using historical data of a measurement of utilization of each resource;
determining a second estimate of resource demand for each resource in each interval of time in the plurality of intervals of time for the new RAN slice using a trained supervised machine learning model;
determining whether to admit the new RAN slice based on a comparison of a sum of the first estimate and the second estimate for each interval of time and each resource to a corresponding defined threshold value per resource; and
admitting the new RAN slice when, for each resource and for each interval in the plurality of intervals, the sum of the first estimate and the second estimate has a value that does not exceed the corresponding defined threshold value.

15. The network node of claim 14, the operations further comprising:
rejecting the new RAN slice based on the sum for an interval of time in the plurality of intervals of time having a value greater than the defined threshold value.

16. A non-transitory computer-readable medium having instructions stored therein that are executable by processing circuitry of a network node for a telecommunications network, whereby execution of the instructions cause the network node to perform operations for a feasibility check of a new radio access network (RAN) slice comprising:
computing a first estimate of occupied resources for each resource within at least one of the network node and a cell of the network node, the first estimate performed for each resource in each interval of time in a plurality of intervals of time using historical data of a measurement of utilization of each resource;
determining a second estimate of resource demand for each resource in each interval of time in the plurality of intervals of time for the new RAN slice using a trained supervised machine learning model;
determining whether to admit the new RAN slice based on a comparison of a sum of the first estimate and the second estimate for each interval of time and each resource to a corresponding defined threshold value per resource; and
admitting the new RAN slice when, for each resource and for each interval in the plurality of intervals, the sum of the first estimate and the second estimate has a value that does not exceed the corresponding defined threshold value.

17. The non-transitory computer-readable medium of claim 16, the operations further comprising:
rejecting the new RAN slice based on the sum for an interval of time in the plurality of intervals of time having a value greater than the corresponding defined threshold value.

18. The network node of claim 14, wherein each resource comprises at least one of:
a hardware resource;
a processing resource; and
a radio resource.

19. The network node of claim 14, wherein the historical data comprises at least one of:
configuration management information for a plurality of network nodes in the telecommunications network;
performance management information for the plurality of network nodes in the telecommunications network; and
traffic recordings for the plurality of network nodes in the telecommunications network.

20. The network node of claim 14, the operations further comprising:
extracting the historical data from:
at least one of:
the network node; and
at least one cell of the network node; and
data for the new RAN slice, the data including a RAN slice profile.

* * * * *